Patented Mar. 8, 1949

2,463,943

UNITED STATES PATENT OFFICE 2,463,943

PRODUCTION OF PENICILLIN SALTS

Otto K. Behrens, Indianapolis, Ind., assignor to Eli Lilly and Company, Indianapolis, Ind., a corporation of Indiana No Drawing. Application October 31, 1946, Serial No. 707,048

5 Claims. (Cl. 260—302)

1

This invention relates to improvements in the production of penicillin, particularly to a method of obtaining dry metallic salts thereof.

Penicillin is produced as a group of metabolic products of certain molds, notably those of the Penicillium notatum-chrysogenum group, and has been found to be of great therapeutic value in combating certain bacterial infections. As usually recovered by commercial processes, penicillin comprises a mixture of several chemically related, therapeutically active compounds together with variable quantities of chemically related non-therapeutic impurities.

In usual commercial production, penicillin is initially recovered from the mold culture medium in an acid form. The acid penicillin is highly unstable in the presence of moisture. Its metal salts are similarly unstable, but to a lesser degree, and with careful handling and avoidance of moisture, their distribution and therapeutic use is practical. Thus, penicillin is commonly marketed dry in the form of one of its metallic salts, notably its sodium, potassium, or calcium salt, and is administered in the form of a freshly prepared aqueous solution of such salt.

In the course of its usual production, penicillin is obtained in partially purified form in organic solution. The penicillin is further purified and extracted from such organic solution in the form of a metal salt, by treating the organic solution with an aqueous solution of alkali, for example sodium hydroxide, to obtain the metal salt of penicillin in aqueous solution. This process may be repeated a number of times with alternate reconversions of the penicillin to acid form in organic solution. To minimize decomposition, the solutions of penicillin must be formed and maintained at a low temperature which preferably does not exceed about 5° C. Finally the salt is recovered by drying an aqueous solution, as by freezing the solution and subjecting the frozen solution to evaporation under high vacuum. Such drying operations are unavoidably slow and inefficient, and are expensive and troublesome.

The primary object of this invention is to provide a simple, rapid, and efficient method of obtaining salts of penicillin, especially the sodium, potassium, and calcium salts, and to provide such a method which may be carried out in liquid phase and at ordinary temperature, which produces substantial purification, and which readily yields such salts in dry solid form. Other objects will be apparent from the following disclosure of the invention.

I have discovered that a solid precipitate consisting of the desired penicillin salt in substantially purified form may readily be obtained by the use of a salt of isoamylethylacetic acid. Salts of isoamylethylacetic acid, especially salts thereof which contain cations desirable in penicillin salts, have the unique property of being readily soluble in solvents which also dissolve penicillin, but in which solvents the corresponding salts of penicillin are insoluble. Such salts of isoamylethylacetic acid react with the penicillin, to form the desirable penicillin salts, which are insoluble and may be recovered as precipitates. This discovery makes it possible to obtain salts of penicillin without the necessity of drying the salts from aqueous solutions and without the difficulty and loss involved in such drying.

The purification obtained is at least equivalent to, and often substantially greater than that obtainable by the common aqueous alkali method. The process is a convenient one, and the presence of water may easily be avoided sufficiently to yield the penicillin in dry form. The solvents used may be convenient non-polar, water-immiscible, organic solvents, which may be obtained substantially anhydrous by simple and common drying methods, as by treatment with desiccating agents such as magnesium sulfate, sodium sulfate, and calcium chloride. The salt-forming reaction produces no water or other by-product which contaminates the desired penicillin. Moreover, solvents may be used in which the penicillin salt is highly insoluble, to obtain convenient recovery in high yield.

In carrying out the invention, the penicillin and the isoamylethylacetic acid salt are brought together in a non-polar, water-immiscible, organic solvent, for example isoamyl acetate. This may be done by stirring the dry salt into a solution containing penicillin, but preferably separate solutions of the penicillin and of the salt are first prepared, and these are combined, with stirring. The amount of isoamylethylacetic acid salt which is used is not critical, but for maximum yield the amount used should be sufficient to supply the required amount of metallic constituent. An amount of the salt which corresponds in weight to about 80 percent of the weight of the total solids in the penicillin solution to be treated has been found to be satisfactory.

The isoamylethylacetic acid salt reacts with the penicillin to form a salt thereof which in a preferred dry solvent separates cleanly as a solid precipitate. The precipitate is removed as by filtration and washed, as with an additional quantity of the same dry non-polar, water-immiscible, organic solvent. It is then preferably subjected to vacuum for a short period to remove any remaining solvent and to insure complete dryness.

The process is preferably carried out in substantially dry solution, for in the presence of moisture the precipitate obtained may be a liquid or semi-liquid material comprising the salt of penicillin and a small amount of moisture, rather than the easily separable solid precipitate obtained when the solutions are dry. When, however, such liquid or semi-liquid precipitates occur, they may be recovered and dried, to yield a dry salt; but this difficulty and extra procedure may be avoided by using dry solutions. The solvents used may be dried by any convenient means, as by treating with desiccating agents such as magnesium sulfate, sodium sulfate and calcium chloride. The penicillin solution is conveniently obtained by extracting an aqueous solution of penicillin with the non-polar, water-immiscible, organic solvent, and drying the organic solution. The solvent for the isoamylethylacetic acid salt may be dried either before or after the salt is dissolved therein.

The penicillin solution used may be one which is specially prepared for this purpose, or conveniently may be an organic solution of partially purified penicillin obtained in the course of separating penicillin from the culture medium in which it is produced.

Various non-polar, water-immiscible, organic solvents which dissolve penicillin may be employed for the purposes of this invention. The solvent may be either a single liquid or a mixture of two or more mutually miscible solvents. The penicillin may be dissolved in one solvent and the isoamylethylacetic acid salt dissolved in another solvent miscible with the penicillin solvent. Preferably, the solvent is one in which the penicillin salt is highly insoluble, for this assures complete precipitation of the penicillin salt. Suitable solvents include for example, amyl acetate, isoamyl acetate, butyl acetate, isobutyl acetate, isopropyl acetate, ethyl acetate, ether, and mixtures thereof. Chloroform may be used, but some penicillin salts are partially soluble therein and accordingly complete precipitation of the desired penicillin salt is not obtained.

The sodium and calcium salts of penicillin commonly used in therapy are readily obtainable by this invention. Other salts of penicillin may also be obtained by this invention by using soluble isoamylethyl acetates of other metallic cations. By "metallic" cations or salts I mean to include not only those derivable from the metals such as potassium, calcium, and sodium, but also metallic-like cations or salts, such as ammonium and substituted ammonium.

This invention eliminates the need of drying aqueous solutions of penicillin salts and the danger of decomposition of penicillin which is always present when penicillin is in the form of an aqueous solution. Additionally, it is found that by precipitating the salt of penicillin according to this invention, a purification of the penicillin results so that penicillin preparations of high potency are obtained. The degree of purification is dependent in part upon the original potency of the penicillin preparation, a relatively impure preparation undergoing a greater degree of purification than a relatively pure preparation. Increases in potency of the penicillin preparation resulting from the purification may range from 25 to 75 percent or more.

The following specific examples show the preparation of metal salts of penicillin in accordance with this invention.

Example 1

The dry sodium salt of penicillin may be obtained as follows:

A solution containing 5 g. of penicillin solids in 2 liters of ether is dried with magnesium sulfate and to this are added with stirring 4 g. of sodium isoamylethyl acetate dissolved in 0.2 liter of ether previously dried over magnesium sulfate. The sodium salt of penicillin separates as a fluffy precipitate. This is removed by filtration, washed with 100 cc. of dry ether and placed in a vacuum drier for a few minutes to remove traces of ether and moisture.

A sodium salt of penicillin prepared in this manner was found to have a potency of 700 Oxford units per milligram of dry material, whereas the comparable salt recovered by evaporation from a frozen aqueous solution had a potency of only 500 Oxford units per milligram of dry material.

Example 2

The dry calcium salt of penicillin may be obtained as follows:

10 g. of calcium isoamylethyl acetate are dissolved in 2 liters of moist ether and the ether solution dried over sodium sulfate. This dried solution is added with stirring to a dried solution containing about 12 g. of penicillin solids in 6 liters of isoamyl acetate. A fluffy precipitate of the calcium salt of penicillin separates, and is removed by filtration, washed with 250 cc. of dry ether and placed in a vacuum drier for a few minutes to remove traces of solvent and moisture.

A sample of a dry calcium salt of penicillin thus prepared was found to possess a potency of 600 Oxford units per milligram of dry material, whereas the comparable salt recovered by evaporation from a frozen aqueous solution had a potency of only 400 Oxford units per milligram.

I claim:

1. The method of preparing a salt of penicillin which comprises bringing together penicillin and a soluble metallic salt of isoamylethylacetic acid, in a non-polar, water-immiscible, organic solvent in which the metallic salt of penicillin produced in the mixture is insoluble, and separating the metallic salt of penicillin which precipitates.

2. The method of preparing a salt of penicillin which comprises mixing a solution of penicillin in a non-polar, water-immiscible, organic solvent with a solution of a metallic salt of isoamylethylacetic acid in a non-polar, water-immiscible, organic solvent, to cause precipitation of the corresponding and insoluble metallic salt of penicillin.

3. The method of preparing the calcium salt of penicillin which comprises treating a solution of penicillin in a non-polar, water-immiscible, organic solvent in which calcium penicillin is insoluble, with calcium isoamylethyl acetate, to precipitate calcium penicillin, and separating the precipitate.

4. The method of preparing the sodium salt of penicillin which comprises treating a solution of penicillin in a non-polar, water-immiscible, organic solvent in which sodium penicillin is insoluble, with sodium isoamylethyl acetate, to precipitate sodium penicillin, and separating the precipitate.

5. The method of preparing the potassium salt of penicillin which comprises treating a solution of penicillin in a non-polar, water-immiscible, organic solvent in which potassium penicillin is insoluble, with potassium isoamylethyl acetate, to precipitate potassium penicillin, and separating the precipitate.

OTTO K. BEHRENS.

No references cited.